United States Patent
Hurst

[15] 3,653,631
[45] Apr. 4, 1972

[54] BALL VALVE CONSTRUCTION

[72] Inventor: Gordon F. Hurst, 540 Callan Ave., San Leandro, Calif. 94577

[22] Filed: Oct. 23, 1969

[21] Appl. No.: 868,754

[52] U.S. Cl..............................251/159, 251/161, 251/170, 251/188, 251/316
[51] Int. Cl.....................................................F16k 5/20
[58] Field of Search..................251/158, 159, 160, 161, 170, 251/171, 172, 188, 315, 316

[56] References Cited

UNITED STATES PATENTS

| 783,953 | 2/1905 | Henry | 251/172 |
| 2,600,898 | 6/1952 | Maxwell | 251/159 |
| 3,038,693 | 6/1962 | Dumm | 251/171 |
| 3,156,445 | 11/1964 | Swain | 251/171 |
| 3,187,776 | 6/1965 | Snell | 251/168 X |
| 3,398,763 | 8/1968 | Richards | 251/172 X |
| 3,473,554 | 10/1969 | King | 251/315 X |
| 3,556,471 | 1/1971 | Paul | 251/315 |

FOREIGN PATENTS OR APPLICATIONS

| 1,131,475 | 6/1962 | Germany | 251/171 |

*Primary Examiner*—Harold W. Weakley
*Attorney*—Julian Caplan

[57] ABSTRACT

A downstream seat for a ball valve has a collar or piston which slides longitudinally in the valve body and is forced against the ball to move the ball into sealing engagement with a stationary upstream sealing element. The piston is externally actuated, either mechanically or hydraulically.

3 Claims, 7 Drawing Figures

INVENTOR.
GORDON F. HURST
BY Julian Caplan
ATTORNEY

BALL VALVE CONSTRUCTION

This invention relates to a new and improved ball valve construction and more particularly relates to a valve wherein an axially slidable collar or piston is located on the downstream side of the valve and means for moving the piston against the ball to force the ball against the upstream stationary seal.

A principal object of the present invention is to provide means for sealing a ball valve in an effective manner both upstream and downstream and to provide means for relaxing the sealing pressure when it is necessary to turn the ball and further to adjust the pressure against the ball to accommodate variations in line pressure and wear of the seals. The piston may be forced against the ball with any desired pressure and may be backed off as required, thereby differing from previous ball valve seals which have been fixed in position relative to the ball and are not conveniently adjusted.

In certain forms of the invention hereinafter described a mechanical means actuated from the exterior of the valve is employed to move the piston. The mechanical movement is of a type that provides for ready adjustment of the piston position in minute increments.

In another form of the invention hereinafter illustrated, hydraulic pressure is used to move the piston, the adjustment of pressure being accomplished in a secondary cylinder, the secondary piston of which is manually adjusted externally of the valve. Here again the adjustment of the pressure against the ball is readily accomplished with freedom from maintenance problems and may be increased and decreased in small increments. Additionally, the hydraulic pressure behind the piston is opposed by the variable line pressure affording opportunity for adjustment of the sealing force of the ball against the upstream seal dependent upon the upstream pressure.

Other objects of the present invention will become apparent from reading the following specification and referring to the accompanying drawings in which similar characters of reference represent corresponding parts in each of the several views.

Figure 1:
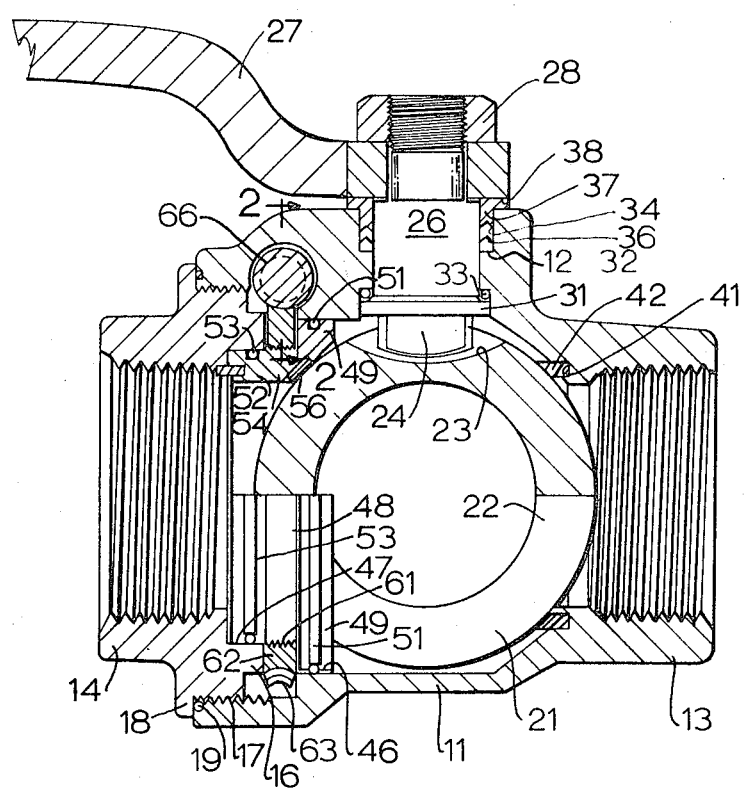
FIG. 1 is a longitudinal sectional view through a valve in accordance with the present invention.
Figure 3:
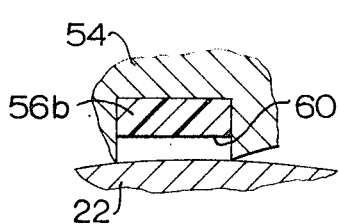
FIG. 3 is a fragmentary sectional view of a modification of the structure of FIG. 1.

In the form of the invention shown in FIG. 1 and FIG. 3 a hollow body 11 is provided formed with a bonnet 12 at its top and an integral hub 13 at one end formed with internal threads for connection to a pipe. At the end opposite hub 13 and axially aligned therewith is a removable hub 14 which is also internally threaded for connection to a pipe. Hub 14 has an annular projection 16 which fits into the interior of body 11 at the downstream side thereof. Hub 14 is threaded into body 11 by means of threads 17 and has an external flange 18 which fits against the end of body 11 and is sealed thereto by seal 19.

Interiorly of body 11 is a ball 21 formed with a port 22 so that when the ball is in the position shown in FIG. 1 the valve is closed and when the ball is turned 90° the port 22 establishes communication between hubs 13 and 14 to open the valve. At the top of ball 21 is an arcuate slot 23 which receives the flat-sided inner end 24 of stem 26 which projects up through bonnet 12 to the exterior of the valve. Handle 27 is attached to stem 26 and held in position by nut 28 threaded onto the exterior end of stem 26. When the handle 27 is turned, stem 26 is likewise turned and the end 24 fitting in the slot 23 turns the ball 21. However, as is shown in FIG. 1, the fit between end 24 and slot 23 is loose enough so that the ball 21 may move axially relative to body 11. When ball 21 is in closed position various means may be used to seal stem 26. As here illustrated, an enlarged collar 31 immediately above portion 24 bears against a reduced diameter shoulder 32 in bonnet 12 with a sealing ring 33 interposed therein. Above shoulder 32 is a bore 34 which receives chevron packing 36. Sleeve 37 fits in bore 34 above the packing and has a peripheral flange 38 which fits on top of bonnet 12 and on the underside of handle 27. Hence, when nut 28 is tightened, sleeve 37 is pressed down against packing 36 and simultaneously collar 31 is pulled up against seal 33. It will be understood that the stem seal heretofore described is only one of many which may be used in conjunction with the valve as is well understood in the valve art.

To accomplish the upstream seal of the valve, a groove 41 is formed in the interior of body 11 immediately inside hub 13. Projecting outwardly from groove 41 and bearing against the exterior of ball 21 is an annular seal ring 42 formed of a suitable material such as Teflon. When, as hereinafter explained, ball 21 is forced to the right as viewed in FIG. 1, the exterior of the ball seals against the ring 42 against considerable upstream pressure applied through hub 13. The valve parts heretofore described will be recognized as being conventional and subject to a wide variation in details of construction.

The downstream side of the valve body 11 is formed with a smooth internal bore 46 and the interior of hub 14 is also formed with a lesser diameter smooth interior bore 47. Annular member 48 located on the downstream side of ball 21 is formed with an enlarged diameter portion 49 which slides inside bore 46 and is formed with a groove to receive a sealing ring 51. The reduced diameter portion 52 slides inside bore 47 and is grooved to receive sealing ring 53. Facing ball 21, annular member 48 is formed with groove 54 which receives annular downstream sealing ring 56. When member 48 is moved to the right as viewed in FIG. 1 and as hereinafter described, seal 56 is forced against the exterior of ball 21 to effect a downstream seal and also the ball 21 is moved to the right to force it against the upstream seal 42.

As shown in FIG. 3, seal 56b may be provided with radial slots 60 in the surface opposing ball 21b to cause deliberate leakage until ball 21b is forced against the upstream seal 42b. Such leakage provides a slow closing effect and diminishes "water hammer." In other respects the structure of FIG. 1A resembles that of FIG. 1 and the same reference numerals followed by subscript b are used to designate corresponding parts.

Figure 2:
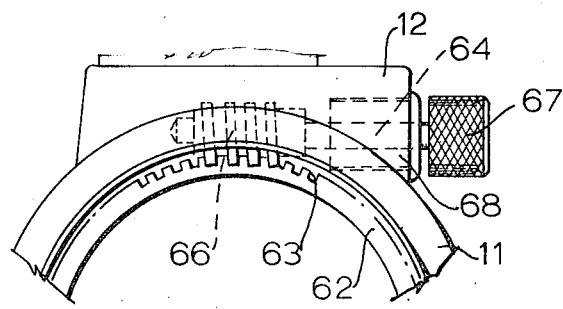
FIG. 2 is an enlarged fragmentary sectional view taken substantially along the line 2—2 of FIG. 1.

FIG. 1 and FIG. 2 illustrate a mechanical means for moving member 48. The reduced diameter portion 52 thereof is formed with external threads 61 mating with internal threads of nut 62. The exterior of nut 62 is formed with a worm wheel 63. Fitting transversely through bonnet 12 is a stem 64 formed with a worm 66 on its interior meshing with worm wheel 63 and having an adjustment knob 67 on the exterior of the valve body. A suitable packing gland 68 of any well-known type seals the stem 64. When knob 67 is turned, worm 66 rotates nut 62 and thus moves member 48 axially. Movement of member 48 adjusts the pressure of downstream seal 56 against ball 21 and also adjusts the movement of ball 21 against the upstream pressure against upstream seal 42. It is apparent that by turning knob 67 the tightness of the seals dependent upon upstream pressure may be adjusted, the tightness of the seals dependent upon downstream pressure may be adjusted to accommodate various upstream pressure and further that by retracting the member 48 the pressure against ball 21 may be reduced to permit it to be turned between open and closed positions.

Figure 4:
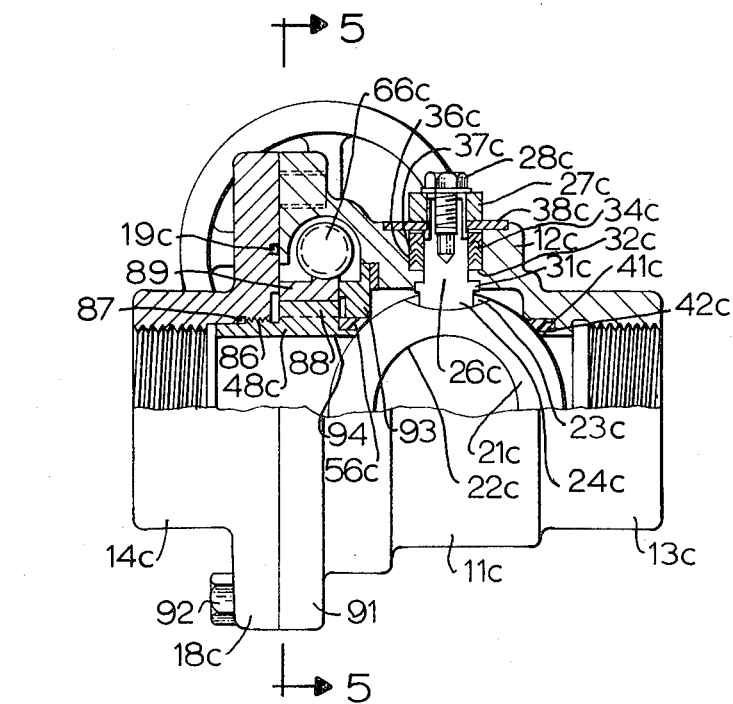
FIG. 4 is a view similar to FIG. 1 of a further modified structure.
Figure 5:
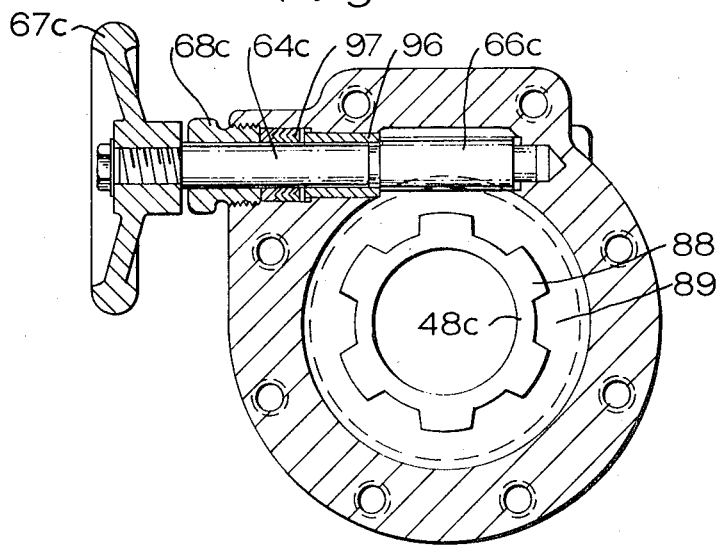
FIG. 5 is a sectional view taken substantially along the line 5—5 of FIG. 3.

The modification of FIGS. 4 and 5 is in several respects similar to that of FIGS. 1 and 2 and the same reference numerals followed by the subscript c are used to designate corresponding parts.

Hub flange 18c is of larger diameter than in FIG. 1 and is bolted to a correspondingly large flange 91 on body 11c by bolts 92. The inner end of the passageway of hub 14c is formed with internal threads 86 mating with external threads on annular member 48c. When, as hereinafter explained, member 48c rotates relative to body 11c, threads 97 cause the member 48c to reciprocate along the axis of hub 14c. To prevent leakage, a seal 87 is installed in a groove in hub 14c bearing against member 48c. To the right of threads 86 member 48c is formed with a splined enlarged diameter portion 88 which mates with an internally splined worm wheel 89. One edge of wheel 89 bears against flange 18c. The other edge of worm wheel 89 bears against thrust ring 93 which is recessed into body 11c. The downstream seal ring 56c is interposed between ring 93 and an extension 94 on member 48c. Transverse worm 66c meshes with worm wheel 89. Stem 64c of wheel 66c extends through a sleeve 96 to the exterior of body 11c. Chevron packing 97 surrounds stem 64c between sleeve 96 and packing gland 68c.

When adjustment knob 67c on stem 64c is turned, worm 66c causes worm wheel 89 to turn and also to turn the splined enlarged diameter portion 88 of member 48c. Thus, the member 48c turns in threads 86 which causes axial movement of member 48c. The seal 56c bearing against ball 21c causes axial movement thereof when the valve is in closed position, adjusting the pressure of the ball 21c against the upstream seal 41c.

Figure 7:
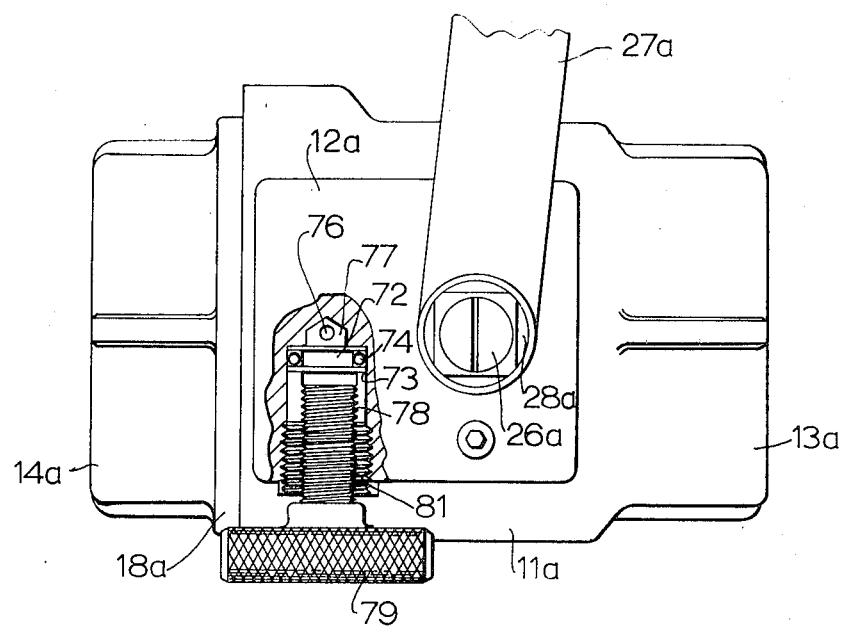
FIG. 7 is a top plan view partly broken away into section of the structure of FIG. 6.
Figure 6:
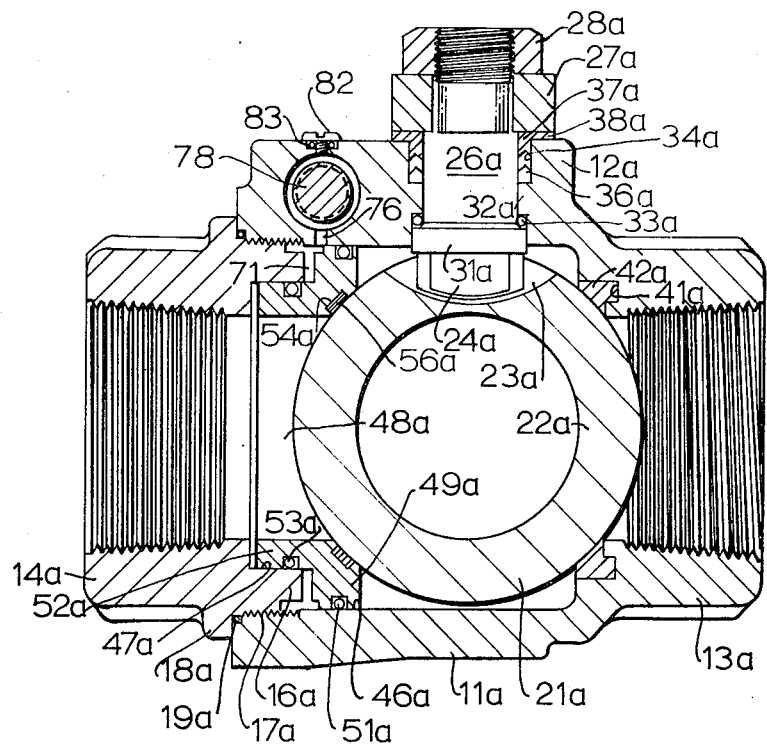
FIG. 6 is a view similar to FIG. 1 of a further modified construction.

The valve shown in FIG. 6 and FIG. 7 is generally similar to that shown in FIG. 1 and 2 and corresponding parts are designated by the same reference numeral followed by the subscript a. It will be noted that a small annular space or cylinder 71 is provided behind enlarged diameter portion 49 of member 48 and in front of projection 16a of hub 14a. Member 48 here functions as a piston. Cylinder 71 is filled with hydraulic fluid. The pressure for the hydraulic fluid is applied by means of a secondary piston 72 sliding in a secondary cylinder 73 in bonnet 12a, piston 72 being grooved to receive a sealing ring 74. A duct 76 extends between the inner end 77 of cylinder 73 and primary cylinder 71. Piston 72 is located on the inner end of threaded stem 78 which screws into bonnet 12a and is provided with a turning knob 79 on the exterior of the valve. A suitable packing nut 81 is provided to seal the exterior of stem 78. Binding head screw 82 and seal 83 close off the port for filling hydraulic fluid into cylinder 73.

In the form of the invention shown in FIG. 6 and FIG. 7, knob 79 is turned to establish within cylinder 73 a pressure which counterbalances the upstream pressure in hub 13 and is also sufficient to move the primary piston 48 to the right as viewed in FIG. 6 to establish the requisite upstream and downstream seals as has been explained in connection with the structure of FIG. 1 and FIG. 2.

What is claimed is:

1. A valve comprising a body formed with aligned pipe-attaching hubs at downstream and upstream ends thereof, a ported ball between said hubs rotatable within said body between open and closed positions, a stem for turning said ball between open and closed positions, said stem rotatable in said body about an axis transverse to the common axis of said hubs, said ball formed with a slot receiving the inner end of said stem, said slot enlarged to permit movement of said ball relative to said stem in a direction longitudinal of said body when said ball is in closed position, an annular upstream seal recessed into said body adjacent said upstream hub adapted to seal against said ball, a rotatable annular member reciprocable longitudinally within said body adjacent said downstream hub and having at its inner end an annular downstream member shaped to engage said ball to move said ball longitudinally into sealing engagement with said upstream seal against the pressure upstream of said valve, a rotatable member within said body engaging said annular member for rotating said annular member, said rotatable member and said annular member being relatively axially slidable, said annular member being in threaded engagement with said body, whereby said annular member reciprocates within said body when turned by said actuating means, said actuating means having a worm with an external turning knob, said rotatable member having a worm wheel meshing with said worm.

2. A valve according to claim 1 in which said annular member is externally splined and said rotatable member is internally splined and meshes with said annular member.

3. A valve according to claim 1, in which the downstream member is formed with slots to relieve pressure, wherein said ball closes slowly against the upstream seal.

* * * * *